United States Patent [19]

Packo

[11] Patent Number: 5,417,873
[45] Date of Patent: May 23, 1995

[54] SEALANT CONTAINING PARTIALLY HYDROLIZED TETRAALKOXY SILONE, FOR AIR CONDITIONING AND REFRIGERATION CIRCUITS

[75] Inventor: Joseph J. Packo, St. Simons Island, Ga.

[73] Assignee: American Patent Group, Inc., Sea Island, Ga.

[21] Appl. No.: 190,448

[22] Filed: Feb. 2, 1994

[51] Int. Cl.$^6$ ............................................. C09K 3/12
[52] U.S. Cl. ....................................... 252/72; 106/33; 252/67; 252/68
[58] Field of Search ............... 252/68, 67, 72; 106/33; 556/463, 483

[56] References Cited

U.S. PATENT DOCUMENTS

| | | | |
|---|---|---|---|
| 3,483,735 | 12/1969 | Packo | 73/40.7 |
| 4,237,172 | 12/1980 | Packo et al. | 428/63 |
| 4,304,805 | 12/1981 | Packo et al. | 428/63 |
| 4,331,722 | 5/1982 | Packo et al. | 428/35 |
| 4,379,067 | 4/1983 | Packo et al. | 252/67 |
| 4,442,015 | 4/1984 | Packo et al. | 252/68 |
| 4,508,631 | 4/1985 | Packo et al. | 252/68 |

FOREIGN PATENT DOCUMENTS 0313095  4/1989  European Pat. Off. .
3707972  9/1988  Germany .

*Primary Examiner*—Christine Skane
*Attorney, Agent, or Firm*—Browdy and Neimark

[57] ABSTRACT

An improved sealant for sealing leaks in pipelines and refrigeration and air conditioning circuits includes a partially hydrolized tetra methoxy silane along with another organo silane sealant. The use of a partially hydrolized tetra alkoxy silane, such as partially hydrolized tetramethoxy silane, in place of an unhydrolized tetra alkoxy silane, gives a stronger and tougher and more elastic seal, and the partially hydrolized material is less toxic than the unhydrolized material.

12 Claims, No Drawings

SEALANT CONTAINING PARTIALLY HYDROLIZED TETRAALKOXY SILONE, FOR AIR CONDITIONING AND REFRIGERATION CIRCUITS

FIELD OF INVENTION

The present invention relates to improvements in sealant compositions for use in sealing small leaks in closed systems and vessels, and especially sealants suitable for sealing leaks in air conditioning and refrigeration systems.

BACKGROUND OF INVENTION

With the advent of the Clean Air Act of 1990, the law now mandates the elimination of emissions (leaks) of CFC/HCFC/HFC refrigerant into the atmosphere from air conditioning and refrigeration systems, as well as emissions (leaks) of pollutant gases from chemical plants and the like. The federally-mandated ban on producing the CFCs after Jan. 1, 1996, will cause a Severe shortage of high cost CFCs in order to maintain the Operation of the equipment dependent on those CFCs that will be in existence for the next 15-20 years. Therefore, it will be imperative to seal leaks to maintain the efficacy of the air conditioning and refrigeration equipment for the sake of economy, as well as to conform to the law. The new alternative HFC refrigerants are also considered to have a global warming effect; therefore, they also should not be emitted (leaked) into the atmosphere.

At today's rate of usage, one year of refrigerant fluid leaks costs about $1.2 billion in lost refrigerant which amounts to 336,000,000 lbs. escaping into the ozone layer with an average unit leaking about 30% of its charge per year.

Excellent sealants according to Packo et al U.S. Pat. Nos. 4,304,805; 4,379,067; 4,237,172; 4,331,722 and 4,442,015 have previously been developed and have served the industry very well. In one commercially successful embodiment according to U.S. Pat. No. 4,379,067, a sealant for stopping leaks in air conditioning and refrigeration circuits comprises a mixture of approximately 30 wt %, bis-(dimethyl amino)methyl silane (BISDAMS), about 60 wt % vinyl trimethoxysilane and about 10 wt % tetramethoxy silane (TMOS). Tetraalkoxy silanes, such as TMOS, have been found useful in this composition as well as other sealant compositions in accordance with the aforementioned patents because the tetraalkoxy silane improves the integrity and toughness of the seal. However, such tetraalkoxy silanes, including TMOS, being derivatives of methyl Silicate, have the problem of toxicity.

SUMMARY OF INVENTION

It is accordingly an object of the present invention to overcome deficiencies in the prior art such as indicated above.

It is another object of the present invention to provide improvements in sealant compositions for sealing small leaks in closed systems and vessels, and particularly leaks in air conditioning and refrigeration systems.

It is another object to accomplish all of the objectives of the aforementioned Packo et al U.S. patents and, at the same time, provide an even stronger seal without the use of any toxic material.

The above objectives are achieved by the use, in the sealing compositions of the aforementioned Packo et al patents, of a partially hydrolized tetraalkoxy silane in place of the unhydrolized tetraalkoxy silane. The contents of said Packo et al patents are hereby incorporated by reference.

The above and other objects and the nature of the invention will be more apparent from the following detailed description of certain embodiments.

DETAILED DESCRIPTION OF EMBODIMENTS

The present compositions use a partially hydrolized tetraalkoxy silane, preferably partially hydrolized TMOS, in an amount of 1%-99% preferably 5-15%, together with at least one other organic silane, preferably at least one aminosilane, most preferably a mixture of bis(dimethylamino)methyl silane (BISDAMS) and vinyltrimethoxy silane. The preferred composition comprises approximately 10% partially hydrolized TMOS, 30 wt % BISDAMS and 60 wt % vinyl trimethoxy silane. Substitution of the partially hydrolized tetraalkoxy silane for the unhydrolized tetraalkoxy silane in the sealant composition results in a slightly flower rate of reaction in the formation of the elastomeric seal at the situs of the leak; surprisingly, however, the resultant seal is tougher, denser and more flexible compared with the seal produced with an otherwise similar composition wherein the tetraalkoxy silane, preferably TMOS, is unhydrolized. Another advantage of the new sealant is that it also stops liquid and gas refrigerants from permeating through the pores of flexible hoses.

The present improved sealant composition can be injected into the system in its neat (undiluted) liquid or vapor form from a can or other pressurized container, or it can be admixed with any appropriate moisture-free liquid, e.g. an inert carrier, a refrigerant and/or a lubricant fluid when the system to be sealed is a refrigeration or air conditioning circuit, or a combustible gas when the system is a gas pipe line or conduit, reference being made to the aforementioned Packo et al patents. As regards lubricant fluids, mention may be made of naphthenic mineral oils, paraffinic mineral oils, alkylbenzene synthetic oils, polyalkylene glycol synthetic oils, polyol ester synthetic oils, etc. The composition may also include other ingredients such as lubrication aids, e.g. 1,3-diketones such as acetylacetone as described in copending application Ser. No. 07/993,655.

Other materials can also be incorporated into the packaged sealant composition, including visuant/leak detectant chemical agents to help externally locate the leak site in the case where the hole in the system is too large for the sealant to seal, e.g. see Packo U.S. Pat. No. 3,483,735.

The sealant of the present invention can be used with all known refrigerants including those mentioned in the above noted Packo et al patents and those more recently developed including HCFCs such as $CH_2FCF_3$(HFC-134a), $CHCl_2CF_3$(HCFC-123) and $CHClF_3$(HCFC-22), as well as $CF_3I$.

Although it is not known whether partially hydrolized tetraalkoxy silanes such as partially hydrolized TMOS are known or not, the method of preparing such partially hydrolized compounds should be well within the capabilities of those skilled in the art of silicon chemistry. This preparation is easily accomplished by introducing a controlled amount of water into a quantity of the tetraalkoxy silane, making sure that the water is thoroughly dispersed, following the same procedures known for the manufacture of hexamethoxy disiloxane and higher polymers of methyl silicate from methyl silicate as a starting material. The chemical reactions are believed to proceed as follows:

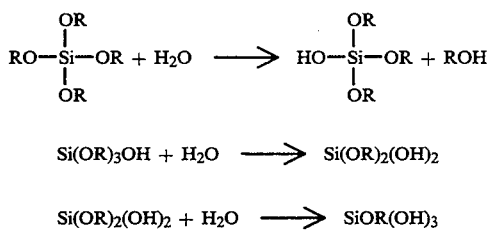

$$Si(OR)_3OH + H_2O \longrightarrow Si(OR)_2(OH)_2$$

$$Si(OR)_2(OH)_2 + H_2O \longrightarrow SiOR(OH)_3$$

wherein R is an alkyl, preferably lower alkyl of 1–6 carbons.

The above reactions will proceed in the presence of excess tetraalkoxy silanes, preferably catalyzed by a weak base such as amine, until all the water is used up. It is important not to add the tetraalkoxy silane to the water, as in that case excess water will be present and the silanes will become fully hydrolized and form complex polymers unsuitable for use in the composition of the present invention.

In theory, one mole of tetraalkoxy silane could react with 4 moles of water to form a fully hydrolized compound $Si(OH)_4$ which is to be avoided. Desirably, the water should be added in such a quantity and at such a rate, preferably with agitation to make sure that the water is thoroughly distributed throughout the tetraalkoxy silane, so that for the most part only one or two of the alkoxy groups become hydrolized, preferably giving a mixture Of $Si(OH)(OR)_3$ and $Si(OH)_2(OR)_2$ with a lesser quantities of unreacted tetraalkoxy silane and more hydrolized product. By "partially hydrolized tetraalkoxy silane" and "partially hydrolized tetramethoxy silane" what is meant is a mixture of said compounds as described immediately above, or any one compound having from one to three of its alkoxy groups hydrolized.

The partial hydrolysis should be carried out under homogeneous conditions to assure a smooth reaction. The use of a dry solvent for the tetraalkoxy silane is advantageous. More desirably, the water should be mixed with a solvent, e.g. methanol; a mixture of 30% water in methanol is desirable. If desired, the reaction Can be speeded up by the use of increased temperatures up to near 100° C., or slowed down by the use of decreased temperatures down to about 20° C.

The composition of the present invention may be injected into the pipeline or circuit to be sealed in accordance with known procedures as already disclosed in the above-identified Packo et al U.S. patents or the aforementioned Packo application Ser. No. 07/993,655. For example, the present composition can be injected in the neat liquid state into the low pressure side of the air conditioning or refrigeration unit through a valved sealant container. By attaching a hose to the high pressure side service port of the unit and to the inlet port of the valved container containing the liquid sealant, and then with another hose attached to the outlet port of the valved sealant container and with the hose attached to the same low pressure side service port of the air conditioning or refrigeration unit; and then by opening both inlet and outlet valves of the sealant container, the liquid sealant will be driven under pressure into the same low pressure side of the unit, during which the neat liquid sealant mixture will be carried throughout the system admixed with the refrigerant to the leak site.

The following is a preferred procedure for injecting neat sealant mixture into an air conditioning or refrigeration system unit:

(1) With the system running, attach an air conditioning or refrigeration valved hose to the high pressure side of the system to be injected.

(2) Open valve of the high side air conditioning and refrigeration hose to purge out air, then close the valve.

(3) Attach high side air conditioning and refrigeration hose to inlet side of the neat liquid sealant container.

(4) Attach a second air conditioning and refrigeration valved hose to the low pressure side of the system to be injected.

(5) Open valve of the low side air conditioning or refrigeration hose to purge out air, then close the valve.

(6) Attach low side air conditioning or refrigeration hose to the outlet side of the neat liquid sealant container.

(7) The open both low and high side air conditioning and refrigeration hose valves that are attached to the neat liquid container (first the low side, then the high side) thereby driving the sealant mixture out of the neat sealant container into the air conditioning and refrigeration system through the low pressure side service port.

(8) The injected sealant mixture will then be admixed with the system's refrigerant and thereby be transported with the refrigerant to the leak site(s) to be sealed.

The invention will now be more fully described by reference to certain specific examples.

Example 1

Example 1 of Packo et al U.S. Pat. No. 4,379,067 was repeated except that the 10 wt % of tetramethoxy silane was replaced with 10 wt % of partially hydrolized tetramethoxy silane. The mixture, injected into an automobile air conditioning unit from which the original refrigerant fluid has leaked, serves to seal the leak site with a stronger, tougher and more flexible seal than that achieved by following Example 1 of U.S. patent '067.

Example 2

Similar to Example 1 above, a refrigerant composition is prepared containing 99.4% CFC-HCFC refrigerant, 0.1% lubricant and the remainder comprising a sealant composition of 35 wt. % BISDAMS, 58 wt % of vinyl trimethoxy silane and 12 wt % of partially hydrolized ethoxy trimethoxy silane. This refrigerant composition is injected into an air conditioning circuit to replace the lost refrigerant and seal the leak(s).

Example 3

A sealant composition is prepared comprising 85% methyl methoxy dimethylamino silane and 15% of partially hydrolized TMOS. This composition is injected in neat form into an air conditioning circuit.

Example 4

A mixture is formed of 98% refrigerant, 1% lubricating oil and 1% of a sealant composition consisting of 70% of partially hydrolized tetramethoxy silane and 30% of trimethyl silane.

Example 5

Example 4 is repeated wherein the sealant consists of 3% partially hydrolized TMOS, 30% dimethyl chloro silane and 57% dimethyl methoxy amino silane.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. In a leak sealing and packaged leak preventing composition packaged within a container for subsequent injection into a refrigeration or air conditioning circuit, said composition comprising at least one organo silane compound capable of reacting with moisture to form a polymeric seal, the improvement wherein said composition comprises a partially hydrolized tetraalkoxy silane which is already partially hydrolized within said container.

2. A packaged composition according to claim 1 wherein said composition comprises 1–99% by weight of said partially hydrolized tetraalkoxy silane.

3. A packaged composition according to claim 1 wherein said partially hydrolized tetraalkoxy silane is partially hydrolized tetramethoxy silane.

4. A packaged composition according to claim 3 wherein said at least one organo silane is a mixture of bis-(dimethylamino) methyl silane and vinyl trimethoxy silane.

5. A packaged composition according to claim 4 wherein said composition comprises 5–15% of said partially hydrolized tetramethoxy silane and 50–70% of said vinyl trimethoxy silane, with the remainder being said bis-(dimethylamino)methyl silane.

6. A packaged composition according to claim 1 wherein said at least one organo silane comprises an amino silane.

7. A packaged composition according to claim 1 further comprising a refrigerant fluid.

8. A packaged composition according to claim 1 further comprising a lubricant fluid.

9. A packaged composition according to claim 8 further comprising acetyl acetone.

10. A packaged composition according to claim 1 further comprising a refrigerant fluid and a lubricant fluid.

11. A composition according to claim 1 substantially free of $Si(OH)_4$.

12. A composition according to claim 2 wherein said partially hydrolized tetraalkoxy silane consists predominantly of molecules having only one and two hydrolized alkoxy groups.

* * * * *

UNITED STATES PATENT AND TRADEMARK OFFICE
CERTIFICATE OF CORRECTION

PATENT NO. : 5,417,873
DATED : May 23, 1995
INVENTOR(S) : Joseph J. Packo

It is certified that error appears in the above-indentified patent and that said Letters Patent is hereby corrected as shown below:

```
Title page, column 1, item [54], second line,
change "SILONE" to --SILANE--.
Column 1, second line of the title, change
change "SILONE" to --SILANE--.
Column 2, line 22, change "flower" to --slower--.
Column 2, line 34, after "admixed" insert --and
 dispersed from a suitable container--.
```

Signed and Sealed this

Sixteenth Day of January, 1996

Attest:

BRUCE LEHMAN

*Attesting Officer*  *Commissioner of Patents and Trademarks*